United States Patent
Helms et al.

(10) Patent No.: US 11,761,670 B2
(45) Date of Patent: Sep. 19, 2023

(54) PARALLEL FAN POWERED TERMINAL UNIT

(71) Applicant: AIR DISTRIBUTION TECHNOLOGIES IP, LLC, Milwaukee, WI (US)

(72) Inventors: Brandon H. Helms, Garland, TX (US); Justin E. Anderson, Garland, TX (US); Steven J. Purdie, Allen, TX (US); Brian S. Redford, Lewisville, TX (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 455 days.

(21) Appl. No.: 16/522,311

(22) Filed: Jul. 25, 2019

(65) Prior Publication Data

US 2020/0363095 A1 Nov. 19, 2020

Related U.S. Application Data (60) Provisional application No. 62/847,073, filed on May 13, 2019.

(51) Int. Cl.
*F24F 13/02* (2006.01)
*F24F 13/10* (2006.01)
*F24F 1/0007* (2019.01)

(52) U.S. Cl.
CPC ........ *F24F 13/0254* (2013.01); *F24F 1/0007* (2013.01); *F24F 13/029* (2013.01); *F24F 13/0245* (2013.01); *F24F 13/0272* (2013.01); *F24F 13/10* (2013.01)

(58) Field of Classification Search
CPC .............. F24F 13/0254; F24F 13/0245; F24F 13/0272; F24F 13/029; F24F 13/10; F24F 1/0007
USPC ......................................................... 454/303
See application file for complete search history.

(56) References Cited

U.S. PATENT DOCUMENTS

| | | | |
|---|---|---|---|
| 2012/0071082 A1* | 3/2012 | Karamanos | F24F 5/0003 29/890.03 |
| 2012/0276836 A1* | 11/2012 | Stewart | F24F 1/009 454/251 |
| 2015/0114596 A1* | 4/2015 | Rohde | F24F 13/10 165/59 |
| 2019/0323730 A1* | 10/2019 | Bang | F24F 1/0063 |
| 2020/0292197 A1* | 9/2020 | Wilson | F24F 11/30 |

FOREIGN PATENT DOCUMENTS

KR 2006127620 A * 12/2006 ............. F24F 11/30

* cited by examiner

*Primary Examiner* — Allen R. B. Schult
(74) *Attorney, Agent, or Firm* — Fletcher Yoder, P.C.

(57) ABSTRACT

Aspects of the present disclosure include a primary air chamber configured to receive primary air, an induced air chamber configured to receive secondary air, a heating coil disposed in the induced air chamber, wherein the heating coil is removable from the induced air chamber without disassembling at least a portion of the induced air chamber, and the heating coil does not receive the primary air, a fan disposed in the induced air chamber, wherein the fan is configured to blow the secondary air received via the induced air chamber toward the heating coil and the heating coil heats the secondary air.

20 Claims, 7 Drawing Sheets

PARALLEL FAN POWERED TERMINAL UNIT

CROSS-REFERENCE TO RELATED APPLICATION

The current application claims priority to U.S. Provisional Application No. 62/847,073, filed on May 13, 2019 and entitled "Parallel Fan Powered Terminal Unit," the contents of which are incorporated by reference in their entireties.

BACKGROUND

Environmental comfort may be an important concern to one or more occupants in a modern structure. Many heating, ventilation, and air conditioning (HVAC) equipment not only maintain a more uniform distribution of temperatures, but also allow an occupant to better control the comfort of their individual spaces. Different regions in a structure may experience different heat load. For example, the outermost region of the structure may experience "skin load" which results from effects such as conduction or convection of heat through an outer wall or window, air infiltration from outside, and/or solar heating. Interior regions may not as susceptible to the skin load, but may be affected by heat given off from people, lights, office equipment, etc. Proper region management enables the environmental control system to maintain comfort in all of the regions, even when the loads shift (e.g., people moving from one room to another, sun moving throughout the day).

In a conventional air handling unit, intake air may be filtered, humidified or dehumidified, and/or heated or cooled to a predetermined temperature at a central unit. The air handling unit may blow the treated primary air into one or more supply ducts that circulate the primary air throughout the structures to the various regions, each regions usually containing a number of terminal units. Each terminal unit may deliver air to a region, such as an individual office, or a group of region. Each terminal unit may be controlled in response to one or more thermostats settings.

A common terminal unit is a parallel fan powered terminal unit. A parallel fan powered terminal unit has an induced air inlet to draw secondary air from a ceiling plenum or return air ducts and a primary inlet with a damper that receives cooled or heated air (primary air) from the primary supply duct (provided by the air handling unit). In some parallel fan powered terminal units, there may be an internal heating coil that increases the temperature of the air (primary or secondary air) before sending into the region. If the heating coil is placed in front of the primary and secondary air flow, the heating coil may impede the air flow. The additional impedance may increase the load of the air handling unit (e.g., requiring the fan to work harder). If the heating coil is placed behind the secondary air flow to heat the secondary air, the heat generated by the heating coil may cause damage to the fan that draws the secondary air. While the heating coil may be placed in the duct in front of the fan, it may be difficult to access and/or service. Therefore, improvements in parallel fan powered terminal units may be desirable.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

An aspect of the present disclosure includes a primary air chamber configured to receive primary air, an induced air chamber configured to receive secondary air, a heating coil disposed in the induced air chamber, wherein the heating coil is removable from the induced air chamber without disassembling at least a portion of the induced air chamber, and the heating coil does not receive the primary air, a fan disposed in the induced air chamber, wherein the fan is configured to blow the secondary air received via the induced air chamber toward the heating coil and the heating coil heats the secondary air.

Some aspects of the present disclosure includes a method for controlling a parallel fan unit including receiving a feedback signal from one or more thermostats, and transmitting, in response to the feedback signal, a control signal to a parallel fan unit, wherein the parallel fan unit comprises: a primary air chamber configured to receive primary air, an induced air chamber configured to receive secondary air, a heating coil disposed in the induced air chamber, wherein the heating coil is removable from the induced air chamber without disassembling at least a portion of the induced air chamber, and the heating coil does not receive the primary air, a fan disposed in the induced air chamber, wherein the fan is configured to blow the secondary air received via the induced air chamber toward the heating coil and the heating coil heats the secondary air.

BRIEF DESCRIPTION OF THE DRAWINGS

The features believed to be characteristic of aspects of the disclosure are set forth in the appended claims. In the description that follows, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

Figure 1:
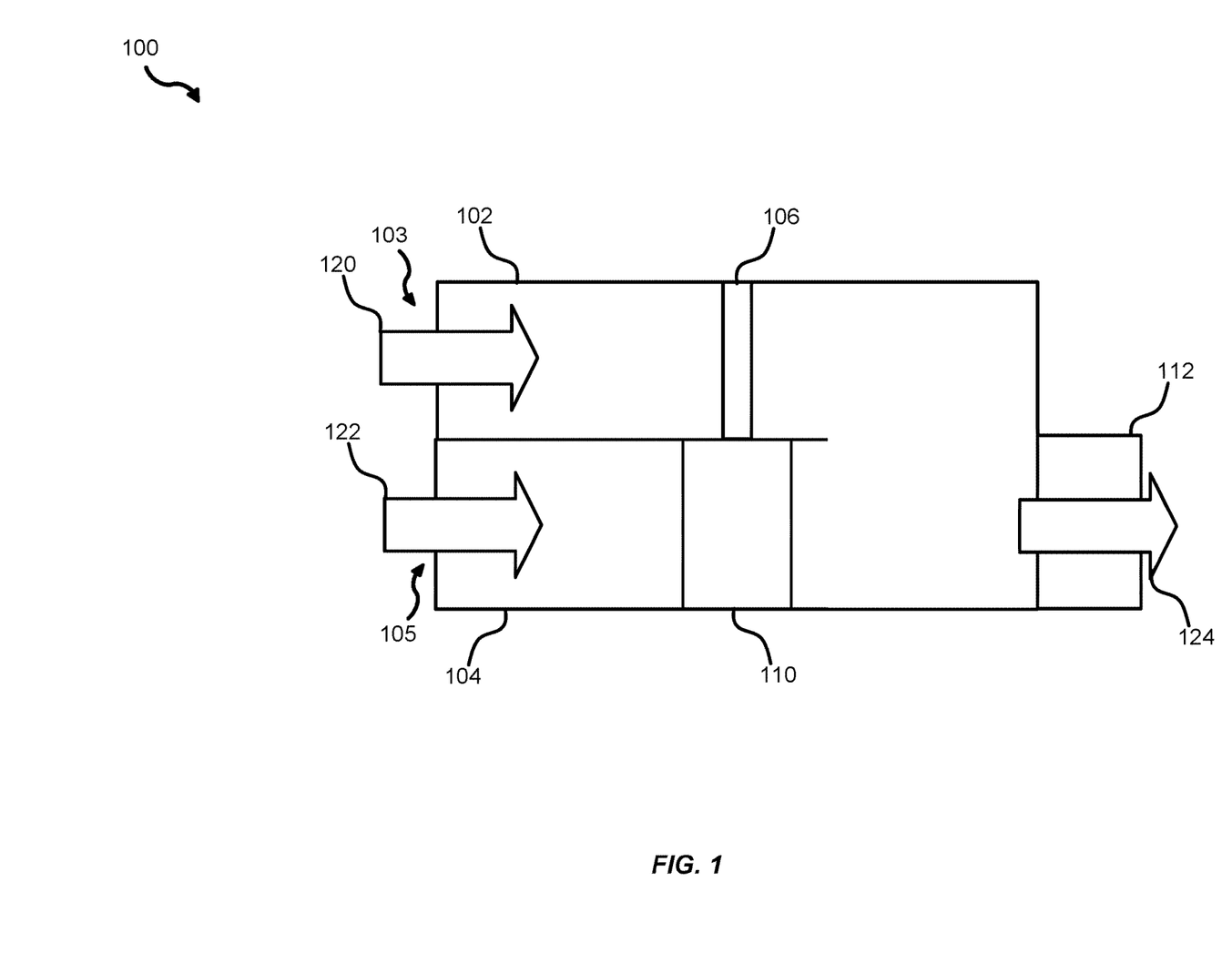
FIG. 1 illustrates an example of a conventional parallel fan unit.

Turning now to FIG. 1, a conventional parallel fan unit 100 may include a primary air chamber 102 and an induced air chamber 104. The primary air chamber 102 may include a primary air inlet 103 that receives primary air 120 from an air handling unit (not shown) via a primary duct (not shown). The air handling unit may be remote (i.e., located at different regions in the structure). The amount of primary air 120 flowing through the primary air chamber 102 may be determined by a primary damper 106. The primary damper 106 may be controlled by an actuator (not shown) for adjusting the amount of the primary air 120 flowing through the conventional parallel fan unit 100. The induced air chamber 104 may include a induced air inlet 105 that receives secondary air 122 from a ceiling plenum or one or more return air ducts (not shown). The primary air 120 and/or the secondary air 122 may be discharged from the conventional parallel fan unit 100 as room air 124. The conventional parallel fan unit 100 may include a fan 110 and a heating coil 112. The heating coil 112 may be a hot water coil, an electric heating coil, or other heating coils that heat the air. The heating coil 112 may heat the primary air 120 and/or the secondary air 122 as the primary air 120 and/or the secondary air 122 pass through. During operation, when the primary damper 106 allows the primary air 120 to flow through the primary air chamber 102, the heating coil 112 may create resistance against the flow of the primary air 120, which may increase the load of the air handling unit.

Figure 2:
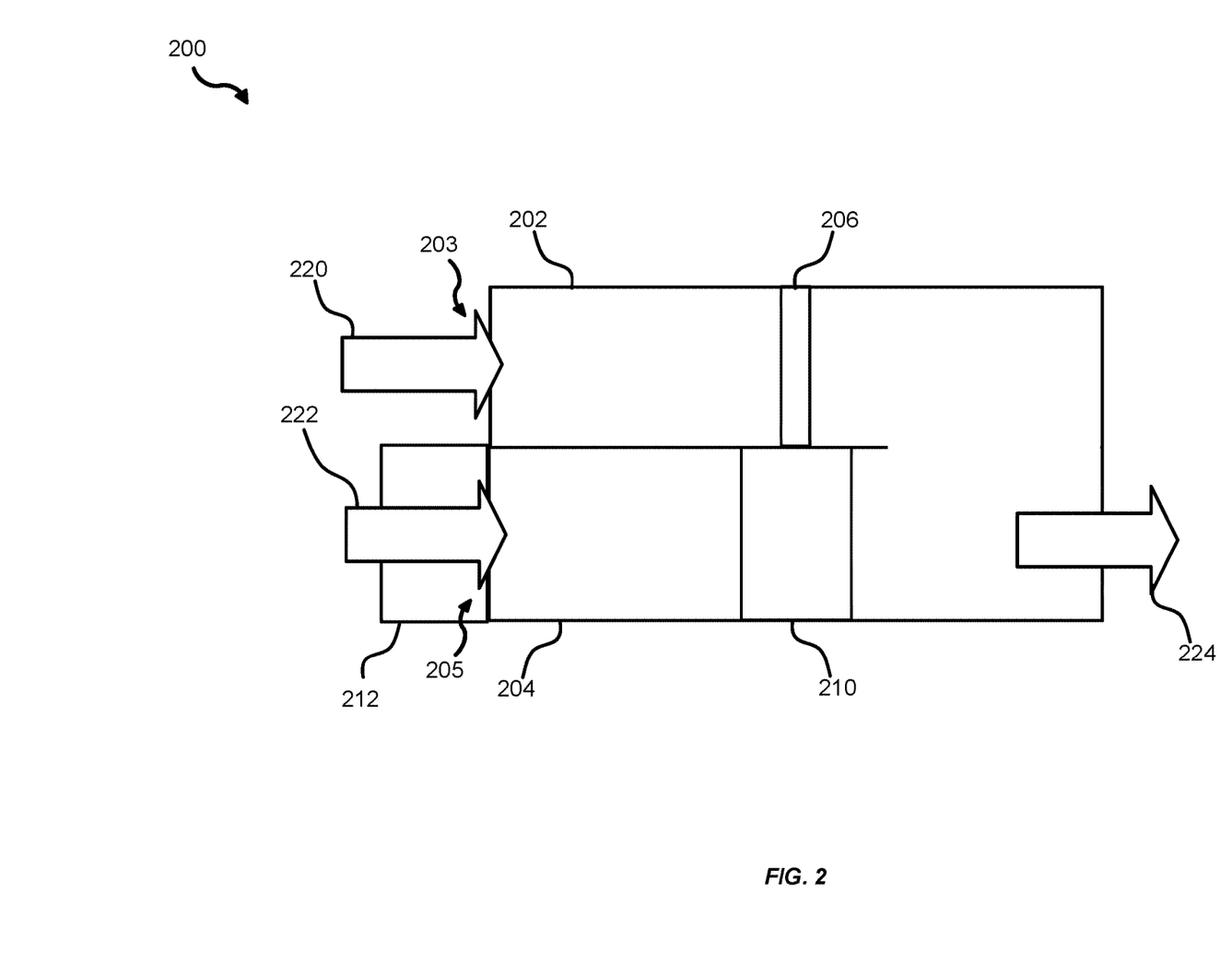
FIG. 2 illustrates another example of a conventional parallel fan unit.

Turning now to FIG. 2, a conventional parallel fan unit 200 may include a primary air chamber 202 and an induced air chamber 204. The primary air chamber 202 may include a primary air inlet 203 that receives primary air 220 from an air handling unit (not shown) via a primary duct (not shown). The amount of primary air 220 flowing through the primary air chamber 202 may be determined by a primary damper 206. The primary damper 206 may be controlled by an actuator (not shown) for adjusting the amount of the primary air 220 flowing through the conventional parallel fan unit 200. The induced air chamber 204 may include a induced air inlet 205 that receives secondary air 222 from the ceiling plenum or one or more return air ducts (not shown). The primary air 220 and/or the secondary air 222 may be discharged from the conventional parallel fan unit 200 as room air 224. The conventional parallel fan unit 200 may include a fan 210 and a heating coil 212. The heating coil 212 may be a hot water coil, an electric heating coil, or other heating coils that heat the air. During operation, the heating coil 212 may heat the secondary air 122 before reaching the fan 210. The heated air 210 may heat components of the fan 210, such as the bearing, the motor, and/or the electronics. The heating of the components of the fan 210 may cause structural damages and failure within the fan 210 (e.g., accelerated bearing wear-and-tear, electronics failure, thermal resets, etc.).

Figure 3:
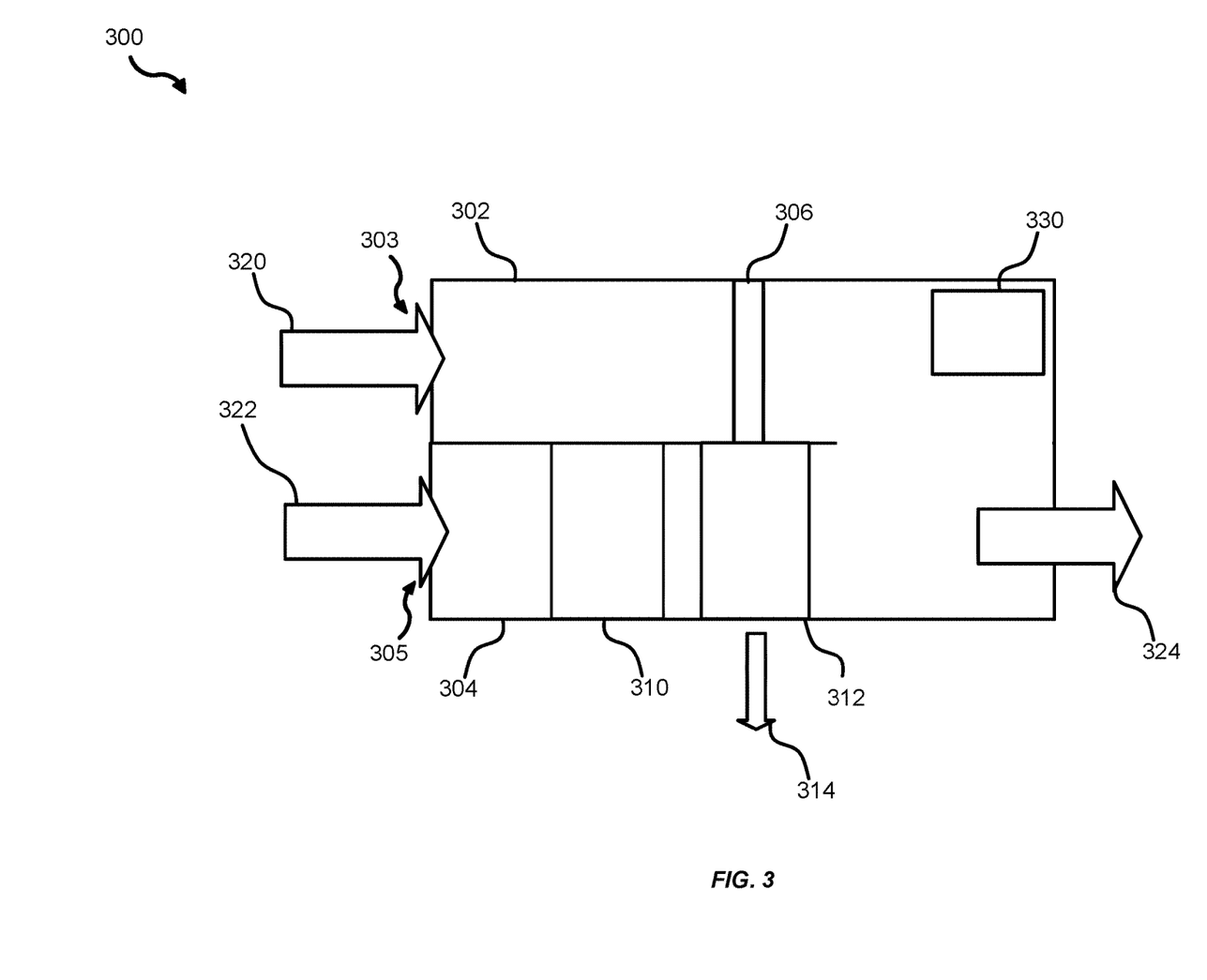
FIG. 3 illustrates an example of a parallel fan unit in accordance with aspects of the present disclosure.

Turning now to FIG. 3, in some implementations, a parallel fan unit 300 may include a primary air chamber 302 and an induced air chamber 304. The primary air chamber 302 may include a primary air inlet 303 that receives primary air 320 from an air handling unit (not shown) via a primary duct (not shown). The amount of primary air 320 flowing through the primary air chamber 302 may be determined by a primary damper 306. The primary damper 306 may be controlled by an actuator (not shown) for adjusting the amount of the primary air 320 flowing through the parallel fan unit 300. The damper 306 may be fully open, partially open, or fully closed. The induced air chamber 304 may include a induced air inlet 305 that receives secondary air 322 from a ceiling plenum or one or more return air ducts (not shown). The primary air 320 and/or the secondary air 322 may be discharged from the parallel fan unit 300 as room air 324. The parallel fan unit 300 may include a fan 310 and a heating coil 312. The heating coil 312 may be a hot water coil, an electric heating coil, or other heating coils that heat the air.

In some examples, the heating coil 312 may be placed "in front" of the fan 310. The fan 310 may receive the secondary air 322 from the ceiling plenum or one or more return air ducts and push the secondary air 322 through the heating coil 312. Since the heating coil 312 is not in the path of the primary air 320, the heating coil 312 does not increase the load of the air handling unit. In another example, the heating coil 312 may be removable for servicing, maintenance, upgrade, repair, inspection, and/or replacement. In one example, a technician (not shown) servicing the heating coil 312 may slide the heating coil 312 downward 314 (e.g., along one or more tracks) to retrieve the heating coil 312. In other examples, an inspector (not shown) inspecting the heating coil 312 may remove the heating coil 312 from sides of the parallel fan unit 300. In certain implementations, the heating coil 312 may be slidingly engaged to the induced air chamber 304. In some aspects, personnel may access the heating coil 312 without disassembling at least a portion of the induced air chamber 304.

The parallel fan unit 300 may include a controller 330. The controller may include one or more processors, a memory, and a communications circuit. The controller 330 may receive indication signals from and provide feedback signals to, for example, one or more environment controllers, one or more handheld devices, and/or other suitable devices as described below.

During operation, in some aspects, if the temperature decreases below a predetermined threshold temperature, the controller 330 may cause (via an actuator) the primary damper 306 in the primary air chamber 302 to open to deliver heated air to the region associated with the parallel fan unit 300 from the air handling unit. In some implementations, the controller 330 may cause the fan 310 to turn off when the primary damper 306 opens beyond a predetermined level. In other implementations, the controller 330 may activate the fan 310 to provide heated air from the induced air chamber 304 (heated by the heating coil 312). As the temperature in the region increases above the predetermined temperature, the controller 330 may cause the primary damper 306 to close and deliver less heated air to the region. When an amount of the primary air 320 is reduced, an amount of secondary air 322 delivered through the induced air chamber 304 may be increased to circulate air in the region. During circulation, the controller 330 may activate or deactivate the heating coil 312. The heating coil 312 may be fully on, partially on, or fully off.

Figure 4:
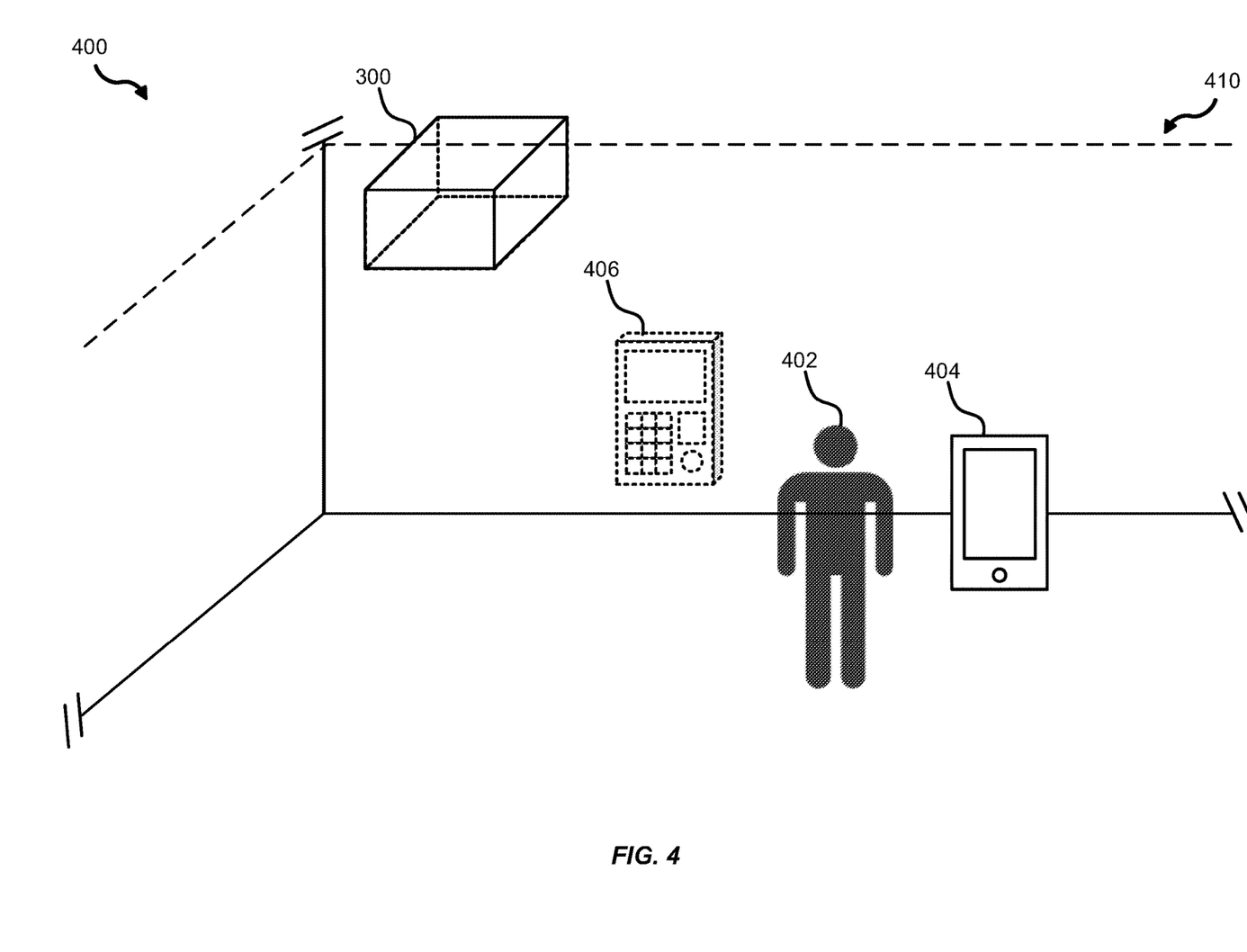
FIG. 4 illustrates an example of an environment for implementing the parallel fan unit in accordance with aspects of the present disclosure.

Turning now to FIG. 4, in some aspects, an environment 400 for operating the parallel fan unit 300 may include a person 402, a handheld device 404, and an optional environment controller 406. The handheld device 404 may be a wireless device, a mobile phone, a cellular phone, a tablet computer, a personal digital assistant, a smartphone, or other portable devices capable of wireless communications. The handheld device 404 and/or the environment controller 406 may be implemented as a computer/microcontroller system (example shown below). The environment controller 406 may be a thermostat. The thermostat may be communicatively coupled with an air handling unit (not shown) that provides cold or warm air.

In some implementations, the environment 400 may include a room 410 including the parallel fan unit 300. The parallel fan unit 300 may control the temperature in the room 410.

Figure 5:
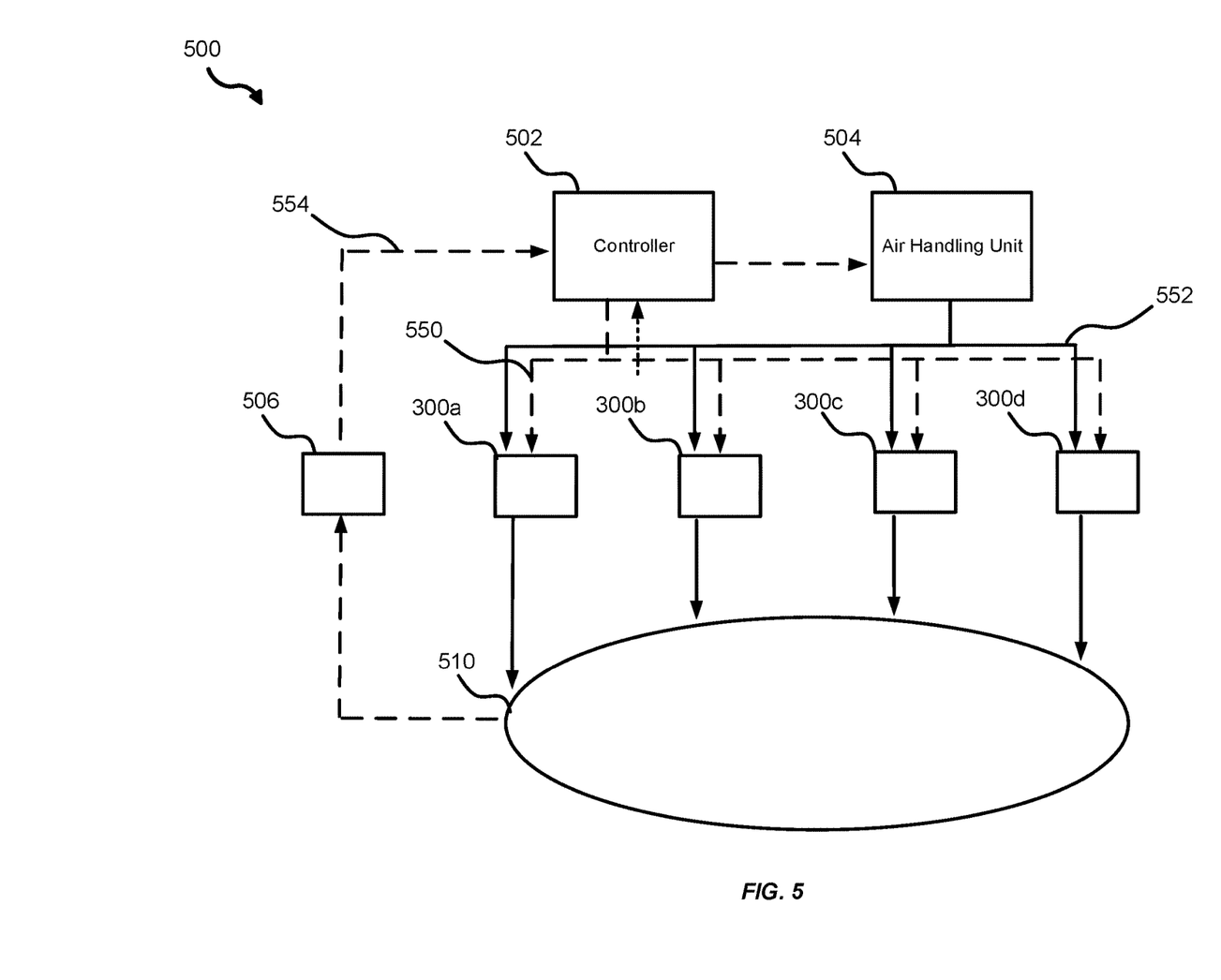
FIG. 5 illustrates an example of a functional diagram for operating the parallel fan unit in accordance with aspects of the present disclosure.

Turning to FIG. 5, in some implementations, an example of an environment 500 for implementing parallel fan units may include a controller 502, an air handling unit 504, a plurality of parallel fan units 300a-d, one or more thermostats 506, and one or more regions 510. The controller 502 may be implemented based on at least one of the handheld device 404 or the environment controller 406. The air handling unit 504 may be configured to provide room-temperature air, cool air, and/or warm air. The one or more regions 510 may include one or more rooms, halls, compartments, closets, foyers, or other places in a structure.

During an example of operation, the controller 502 (e.g., the handheld device 404 or the environment controller 406) may transmit one or more control signals 550 to the air handling unit 504 to activate the flow of room-temperature air, cool air, and/or warm air. The controller 502 may transmit the one or more control signals 550 to the plurality of parallel fan units 300a-d to fully open, partially open, or close the respective primary damper 306 to allow more/less air flow 552 (e.g., room-temperature air, humidified air, filtered air, cool air, and/or warm air) from the air handling unit 504 to the one or more regions 510 via the plurality of parallel fan units 300a-d.

In an example, the controller 502 may receive one or more feedback signals 554 from the one or more thermostats 506. The one or more feedback signals 554 may include temperature information. The temperature information may indicate that the temperature in the one or more regions 510 is higher than a predetermined threshold temperature. The controller 502 (e.g., the handheld device 404, the environment controller 406, and/or applications installed in the handheld device 404 or the environment controller 406), in response to receiving the temperature information, may transmit the one or more control signals 550 to the air handling unit 504 to increase the air flow 552 (e.g., cool air) and/or to one or more of the plurality of parallel fan units 300 a-d (e.g., to the controllers 330) to fully open or partially open the respective primary dampers 306 to lower the temperature in the one or more regions 510.

In another example, the controller 502 may receive one or more feedback signals 554 from the one or more thermostats 506. The one or more feedback signals 554 may include temperature information. The temperature information may indicate that the temperature in the one or more regions 510 is lower than a predetermined threshold temperature. The controller 502 (e.g., the handheld device 404, the environment controller 406, and/or applications installed in the handheld device 404 or the environment controller 406), in response to receiving the temperature information, may transmit the one or more control signals 550 to the air handling unit 504 to increase the air flow 552 (e.g., warm air) and/or to one or more of the plurality of parallel fan units 300 a-d (e.g., to the controllers 330) to open the respective primary dampers 306 to increase the temperature in the one or more regions 510. Alternatively or additionally, the controller 502 may transmit the one or more control signals 550 to one or more of the plurality of parallel fan units 300 a-d (e.g., to the controllers 330) to activate the fans 310 and the heating coils 312.

Figure 6:
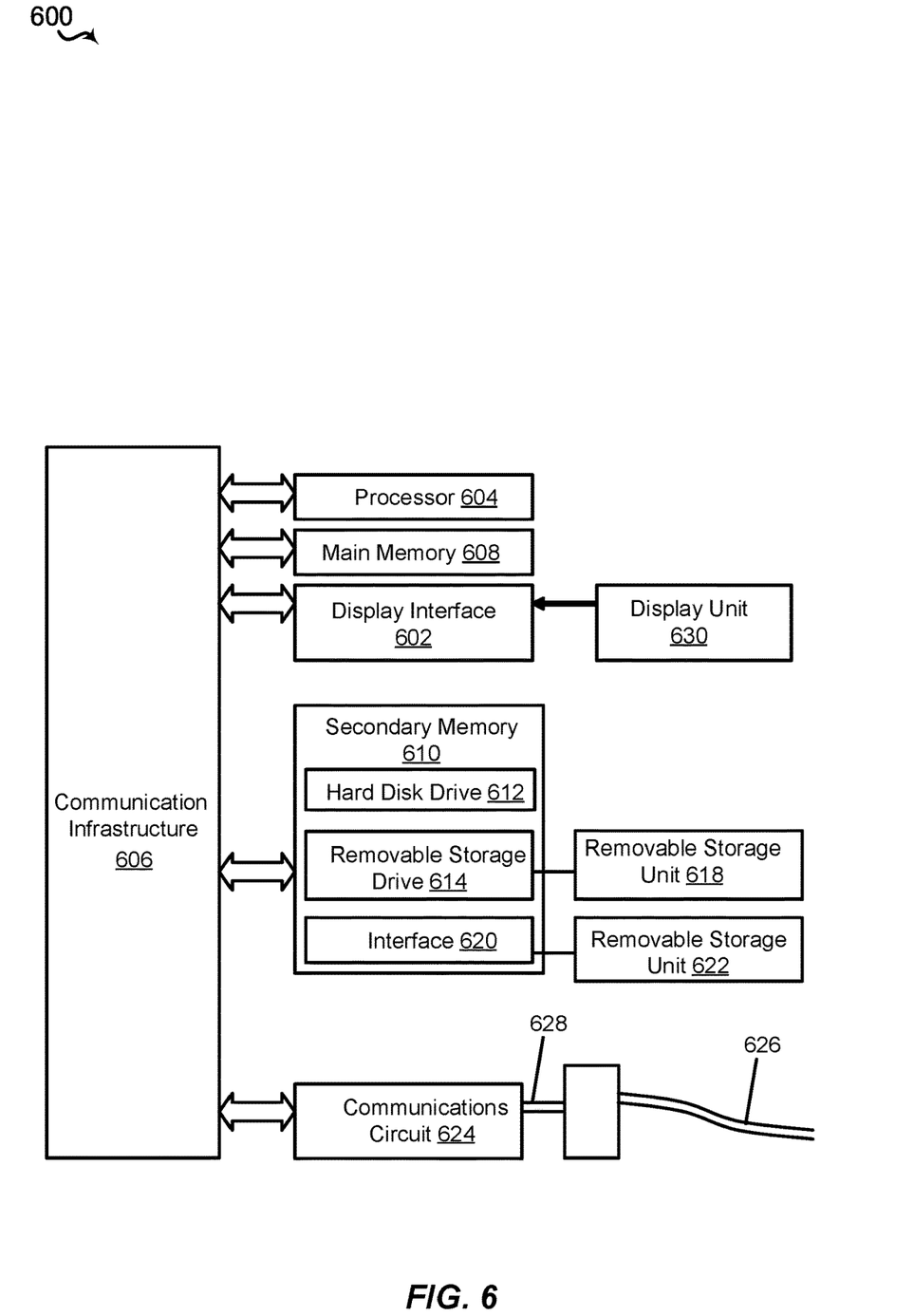
FIG. 6 illustrates an example of a computer system in accordance with aspects of the present disclosure.

Aspects of the present disclosures may be implemented using hardware, software, or a combination thereof and may be implemented in one or more computer systems or other processing systems. In an aspect of the present disclosures, features are directed toward one or more computer systems capable of carrying out the functionality described herein. An example of such the system 600 is shown in FIG. 6. In some examples, the controller 502 may be implemented as the system 600 shown in FIG. 6. The controller 502 may include some or all of the components of the system 600. In some aspects, the controller 330 of the parallel fan unit 300 may be implemented as the system 600 shown in FIG. 6. The controller 330 of the parallel fan unit 300 may include some or all of the components of the system 600.

The system 600 includes one or more processors, such as processor 604. The processor 604 is connected with a communication infrastructure 606 (e.g., a communications bus, cross-over bar, or network). Various software aspects are described in terms of this example computer system. After reading this description, it will become apparent to a person skilled in the relevant art(s) how to implement aspects of the disclosures using other computer systems and/or architectures.

The system 600 may include a display interface 602 that forwards graphics, text, and other data from the communication infrastructure 606 (or from a frame buffer not shown) for display on a display unit 630. System 600 also includes a main memory 608, preferably random access memory (RAM), and may also include a secondary memory 610. The secondary memory 610 may include, for example, a hard disk drive 612, and/or a removable storage drive 614, representing a floppy disk drive, a magnetic tape drive, an optical disk drive, a universal serial bus (USB) flash drive, etc. The removable storage drive 614 reads from and/or writes to a removable storage unit 618 in a well-known manner. Removable storage unit 618 represents a floppy disk, magnetic tape, optical disk, USB flash drive etc., which is read by and written to removable storage drive 614. As will be appreciated, the removable storage unit 618 includes a computer usable storage medium having stored therein computer software and/or data. In some examples, one or more of the main memory 608, the secondary memory 610, the removable storage unit 618, and/or the removable storage unit 622 may be a non-transitory memory.

Alternative aspects of the present disclosures may include secondary memory 610 and may include other similar devices for allowing computer programs or other instructions to be loaded into system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow software and data to be transferred from the removable storage unit 622 to system 600.

System 600 may also include a communications circuit 624. The communications circuit 624 may allow software and data to be transferred between system 600 and external devices. Examples of the communications circuit 624 may include a modem, a network interface (such as an Ethernet card), a communications port, a Personal Computer Memory Card International Association (PCMCIA) slot and card, etc. Software and data transferred via the communications circuit 624 are in the form of signals 628, which may be electronic, electromagnetic, optical or other signals capable of being received by the communications circuit 624. These signals 628 are provided to the communications circuit 624 via a communications path (e.g., channel) 626. This path 626 carries signals 628 and may be implemented using wire or cable, fiber optics, a telephone line, a cellular link, an RF link and/or other communications channels. In this document, the terms "computer program medium" and "computer usable medium" are used to refer generally to media such as a removable storage drive 618, a hard disk installed in hard disk drive 612, and signals 628. These computer program products provide software to the system 600. Aspects of the present disclosures are directed to such computer program products.

Computer programs (also referred to as computer control logic) are stored in main memory 608 and/or secondary memory 610. Computer programs may also be received via communications circuit 624. Such computer programs, when executed, enable the system 600 to perform the features in accordance with aspects of the present disclosures, as discussed herein. In particular, the computer programs, when executed, enable the processor 604 to perform the features in accordance with aspects of the present disclosures. Accordingly, such computer programs represent controllers of the system 600.

In an aspect of the present disclosures where the method is implemented using software, the software may be stored in a computer program product and loaded into system 600 using removable storage drive 614, hard drive 612, or communications interface 620. The control logic (software), when executed by the processor 604, causes the processor 604 to perform the functions described herein. In another aspect of the present disclosures, the system is implemented primarily in hardware using, for example, hardware components, such as application specific integrated circuits (ASICs). Implementation of the hardware state machine so as to perform the functions described herein will be apparent to persons skilled in the relevant art(s).

Figure 7:
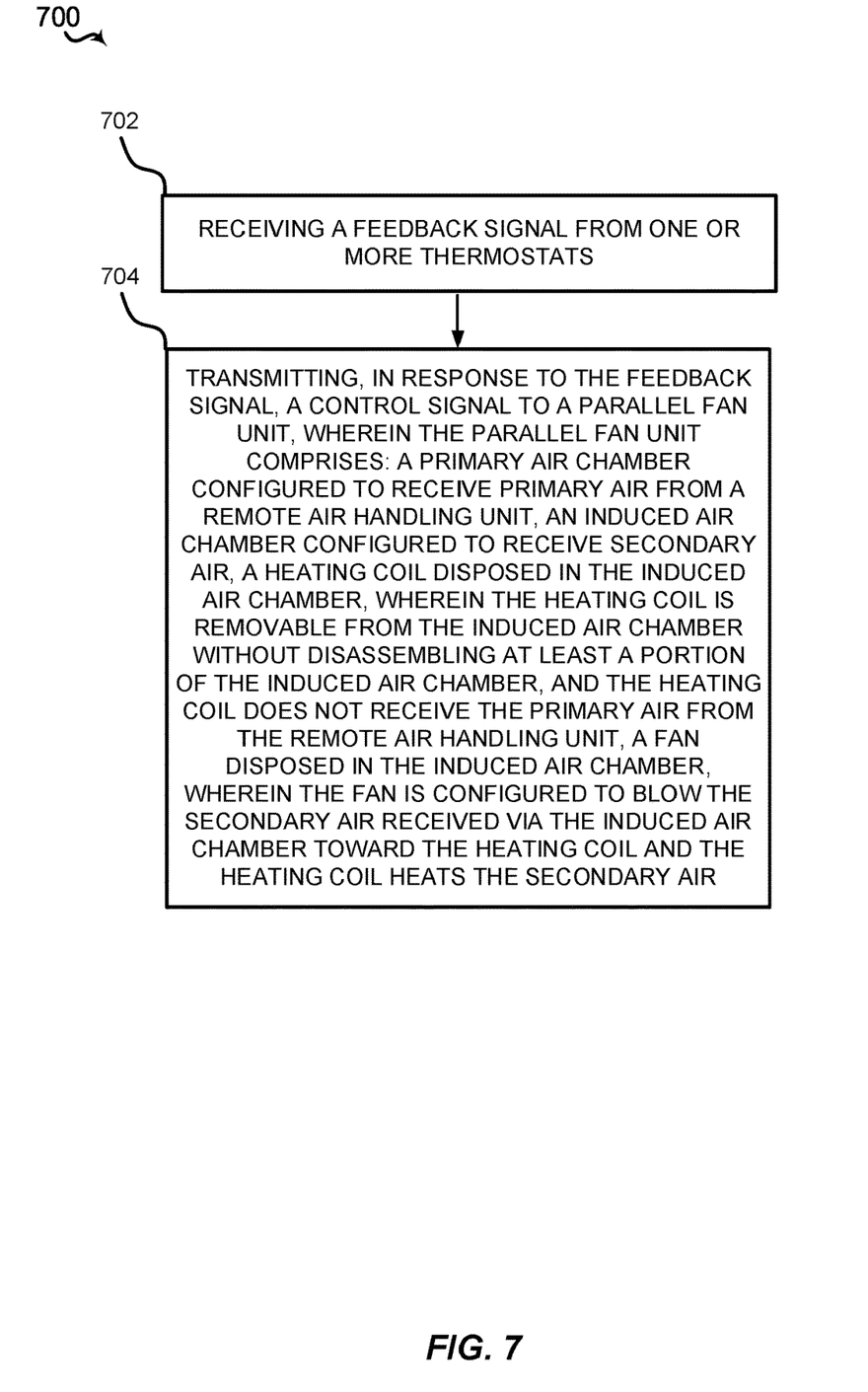
FIG. 7 illustrates an example of a method for controlling a parallel fan in accordance with aspects of the present disclosure.

Turning now to FIG. 7, a method 700 for controlling a parallel fan unit may be performed by the controller 502, which may be implemented based on at least one of the handheld device 404, the environment controller 406, or an application in the handheld device 404 and/or the environment controller 406.

At block 702, the method 700 may receive a feedback signal from one or more thermostats. For example, the communications circuit (e.g., a communications circuit 6247) and/or the processor (e.g., the one or more processors 604) of the handheld device 404 may receive a feedback signal from the one or more thermostats 506. The feedback signal may include temperature information relating to the one or more regions.

At block 704, the method 700 may transmit, in response to the feedback signal, a control signal to a parallel fan unit, wherein the parallel fan unit comprises: a primary air chamber configured to receive primary air, a induced air chamber configured to receive secondary air, a heating coil disposed in the induced air chamber, wherein: the heating coil is removable from the induced air chamber without disassembling at least a portion of the induced air chamber, and the heating coil does not receive the primary air, a fan disposed in the induced air chamber, wherein the fan is configured to blow the secondary air received by the induced air chamber toward the heating coil. For example, the communications circuit (e.g., the communications circuit 724) and/or the processor (e.g., the one or more processors 704) of the handheld device 404 may transmit a control signal to the parallel fan unit 300.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A terminal unit, comprising:
   a primary air chamber configured to receive primary air from an air handling unit, wherein the primary air comprises conditioned air;
   an induced air chamber configured to receive secondary air from a conditioned space;
   a heating coil disposed in the induced air chamber, wherein:
      the heating coil is removable from the induced air chamber without disassembling at least a portion of the induced air chamber; and
      the heating coil does not receive the primary air; and
   a fan disposed in the induced air chamber and upstream of the heating coil relative to a flow direction of the secondary air through the induced air chamber, wherein the fan is configured to blow the secondary air received via the induced air chamber toward the heating coil, the heating coil is configured to heat the secondary air, and the terminal unit is configured to combine the primary air and the secondary air heated by the heating coil and to discharge a mixture of the primary air and the secondary air heated by the heating coil as room air.

2. The terminal unit of claim 1, further comprising a damper in the primary air chamber configured to regulate a flow of the primary air through the primary air chamber.

3. The terminal unit of claim 2, further comprising a controller including:
a memory;
a communications circuit; and
one or more processors communicatively coupled with the memory and the communications circuit, wherein the one or more processors are configured to:
receive, via the communications circuit, one or more control signals; and
control at least one of the damper, the heating coil, or the fan in response to the one or more control signals.

4. The terminal unit of claim 1, wherein the heating coil slidingly engages the induced air chamber.

5. The terminal unit of claim 1, wherein the heating coil slidingly engages the induced air chamber via one or more tracks.

6. The terminal unit of claim 2, further comprising a controller comprising:
a memory;
a communications circuit; and
one or more processors communicatively coupled with the memory and the communications circuit, wherein the one or more processors are configured to:
receive, via the communications circuit, one or more control signals; and
control the damper in response to the one or more control signals.

7. The terminal unit of claim 1, further comprising a controller comprising:
a memory;
a communications circuit; and
one or more processors communicatively coupled with the memory and the communications circuit, wherein the one or more processors are configured to:
receive, via the communications circuit, one or more control signals; and
control the fan in response to the one or more control signals.

8. The terminal unit of claim 1, wherein the heating coil is configured to slidingly engage with one or more tracks of the induced air chamber, and the heating coil is removable from the induced air chamber via sliding along the one or more tracks in a direction crosswise to a length of the terminal unit.

9. The terminal unit of claim 1, wherein the heating coil is removable from the induced air chamber via a side of the terminal unit.

10. The terminal unit of claim 1, wherein the induced air chamber is configured to receive the secondary air from the conditioned space via a ceiling plenum or a return air duct.

11. The terminal unit of claim 1, wherein the conditioned air comprises warmed air, cooled air, room-temperature air, or a combination thereof.

12. The terminal unit of claim 1, wherein the heating coil comprises a hot water coil or an electric heating coil.

13. The terminal unit of claim 3, further comprising an actuator coupled to the damper, wherein the controller is communicatively coupled to the actuator, and the controller is configured to control the actuator to actuate the damper in response to the one or more control signals.

14. The terminal unit of claim 3, wherein the controller is configured to activate the heating coil in response to the one or more control signals, deactivate the heating coil in response to the one or more control signals, or both.

15. The terminal unit of claim 3, wherein the controller is configured to activate the fan in response to the one or more control signals, deactivate the fan in response to the one or more control signals, or both.

16. A method of controlling air flow, comprising:
receiving a feedback signal from a thermostat; and
transmitting, in response to the feedback signal, one or more control signals to a terminal unit, wherein the terminal unit comprises:
a primary air chamber configured to receive primary air from an air handling unit, wherein the primary air comprises conditioned air;
an induced air chamber configured to receive secondary from a conditioned space
a heating coil disposed in the induced air chamber, wherein:
the heating coil is removable from the induced air chamber without disassembling at least a portion of the induced air chamber; and
the heating coil does not receive the primary air; and
a fan disposed in the induced air chamber and upstream of the heating coil relative to a flow direction of the secondary air through the induced air chamber, wherein the fan is configured to blow the secondary air received via the induced air chamber toward the heating coil, the heating coil is configured to heat the secondary air, and the terminal unit is configured to combine the primary air and the secondary air heated by the heating coil and to discharge a mixture of the primary air and the secondary air heated by the heating coil as room air.

17. The method of claim 16, wherein the terminal unit further comprises a damper in the primary air chamber for regulating a flow of the primary air through the primary air chamber.

18. The method of claim 17, wherein the terminal unit further comprises a controller including:
a memory;
a communications circuit; and
one or more processors communicatively coupled with the memory and the communications circuit, wherein the one or more processors are configured to:
receive, via the communications circuit, the one or more control signals; and
control at least one of the damper, the heating coil, or the fan in response to the one or more control signals.

19. The method of claim 16, wherein the heating coil slidingly engages the induced air chamber.

20. The method of claim 16, wherein the heating coil slidingly engages the induced air chamber along one or more tracks.

* * * * *

UNITED STATES PATENT AND TRADEMARK OFFICE
CERTIFICATE OF CORRECTION

PATENT NO. : 11,761,670 B2
APPLICATION NO. : 16/522311
DATED : September 19, 2023
INVENTOR(S) : Brandon M. Helms et al.

It is certified that error appears in the above-identified patent and that said Letters Patent is hereby corrected as shown below:

On the Title Page

In Item (72) under "INVENTORS", delete "Brandon H. Helms" and insert -- Brandon M. Helms --

Signed and Sealed this
Twenty-fourth Day of September, 2024

Katherine Kelly Vidal
*Director of the United States Patent and Trademark Office*